(12) United States Patent
Kroemmer et al.

(10) Patent No.: US 6,848,867 B2
(45) Date of Patent: Feb. 1, 2005

(54) DEVICE FOR PASSING HEAVILY FLOWING BULK MATERIAL INTO A DELIVERY PIPE

(75) Inventors: Yvan Kroemmer, Goetzingen (LU); Stefano Beni, Differdange (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 10/380,755

(22) PCT Filed: Sep. 12, 2001

(86) PCT No.: PCT/EP01/10518

§ 371 (c)(1),
(2), (4) Date: Mar. 18, 2003

(87) PCT Pub. No.: WO02/22476

PCT Pub. Date: Mar. 21, 2002

(65) Prior Publication Data

US 2004/0096280 A1 May 20, 2004

(30) Foreign Application Priority Data

Sep. 18, 2000 (LU) .................................................. 90639

(51) Int. Cl.[7] .............................................. B65G 53/38
(52) U.S. Cl. ......................... 406/91; 406/128; 406/138
(58) Field of Search ............................. 406/89, 90, 91, 406/138, 128; 222/195

(56) References Cited

U.S. PATENT DOCUMENTS

| | | | | |
|---|---|---|---|---|
| 2,125,913 A | * | 8/1938 | Goebels ...................... 366/137 |
| 2,192,287 A | | 3/1940 | Goebels | |
| 2,316,814 A | * | 4/1943 | Ripley .......................... 406/89 |
| 2,613,854 A | * | 10/1952 | Jens et al. ................... 222/168 |
| 3,084,001 A | * | 4/1963 | Loomis ....................... 406/138 |
| 3,134,513 A | * | 5/1964 | Ashman ...................... 406/138 |
| 3,149,884 A | * | 9/1964 | Jones ......................... 406/138 |
| 3,512,841 A | * | 5/1970 | Kollasch et al. ............. 406/137 |
| 3,619,011 A | * | 11/1971 | Doble ......................... 406/129 |
| 3,865,280 A | * | 2/1975 | Thomson ..................... 406/90 |
| 3,874,642 A | * | 4/1975 | Franz et al. .................... 366/3 |
| 3,929,261 A | | 12/1975 | Solimar | |
| 3,933,394 A | * | 1/1976 | Klein et al. ................... 406/90 |
| 4,019,783 A | | 4/1977 | Kayser | |
| 4,375,335 A | * | 3/1983 | Klein-Albenhausen ....... 366/15 |
| 4,417,832 A | * | 11/1983 | Krauss ........................ 406/90 |
| 4,615,649 A | * | 10/1986 | Sharpless .................... 406/138 |
| 4,953,792 A | * | 9/1990 | Evans ......................... 239/654 |
| 5,161,473 A | * | 11/1992 | Landphair et al. ............ 111/176 |
| 5,839,669 A | * | 11/1998 | Borner et al. ............... 239/704 |
| 5,853,160 A | * | 12/1998 | Hurdis et al. ............ 251/30.02 |

FOREIGN PATENT DOCUMENTS

| | | |
|---|---|---|
| EP | 0247235 | 12/1987 |
| EP | 0543100 | 5/1993 |
| GB | 815882 | 7/1959 |
| GB | 1047125 | 11/1996 |
| JP | 58104829 | 6/1983 |
| LU | 90217 | 8/1999 |

* cited by examiner

Primary Examiner—Joe Dillon, Jr.
(74) Attorney, Agent, or Firm—McCormick, Paulding & Huber LLP

(57) ABSTRACT

A device for introducing poorly flowing bulk material into a feed line includes a swirl chamber connectable to a feed line so as to form an inlet aperture in a side wall of the swirl chamber. The device further includes a diffuser plate through which a loosening fluid may be introduced into the swirl chamber. The diffuser plate is arranged in the vicinity of the inlet aperture in the side wall of the swirl chamber. A device for producing a gas flow is also provided inside the swirl chamber, the gas flow being directed in the direction of the inlet aperture.

10 Claims, 5 Drawing Sheets

DEVICE FOR PASSING HEAVILY FLOWING BULK MATERIAL INTO A DELIVERY PIPE

CROSS-REFERENCE TO RELATED APPLICATIONS

Figure 1:
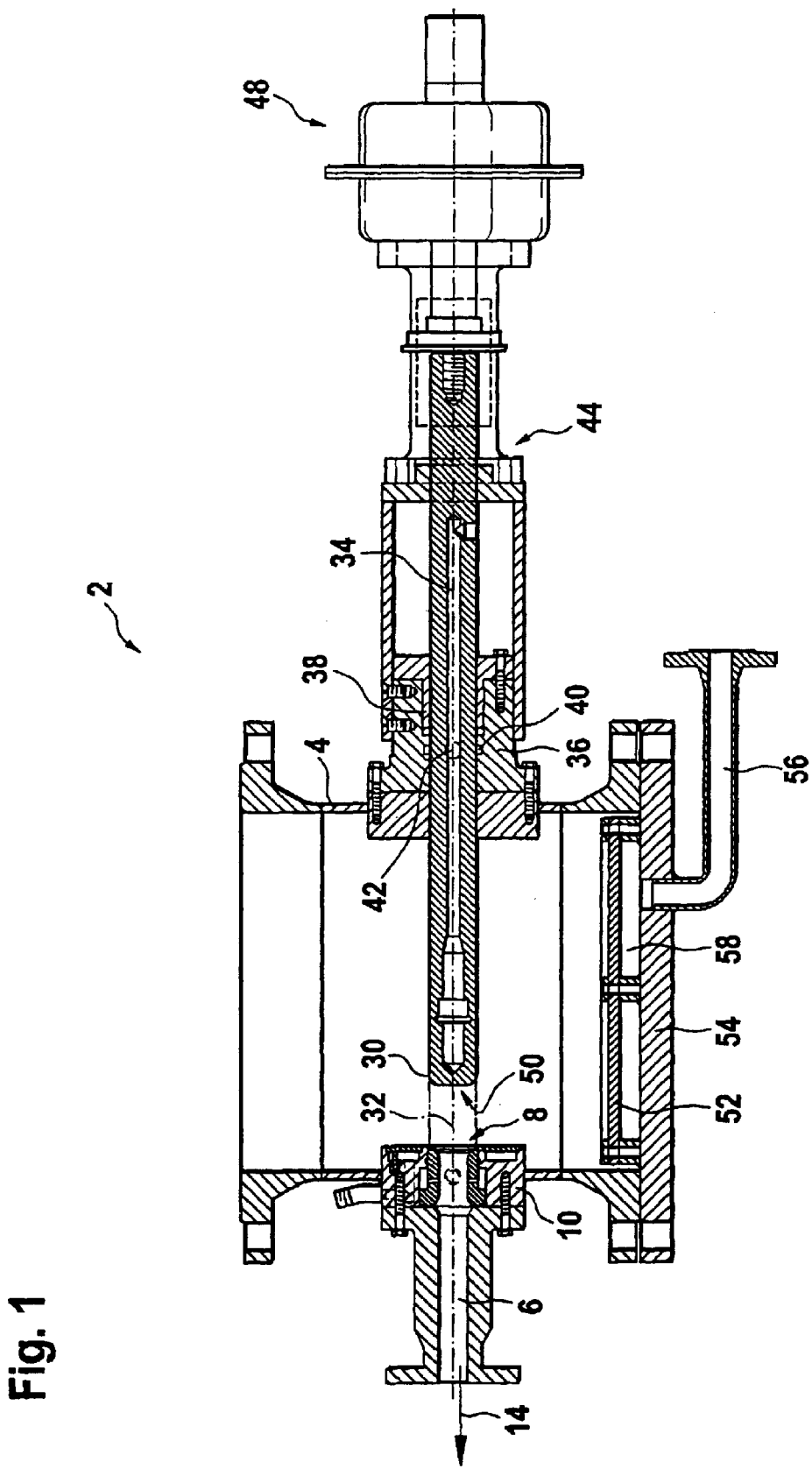
Figure 2:
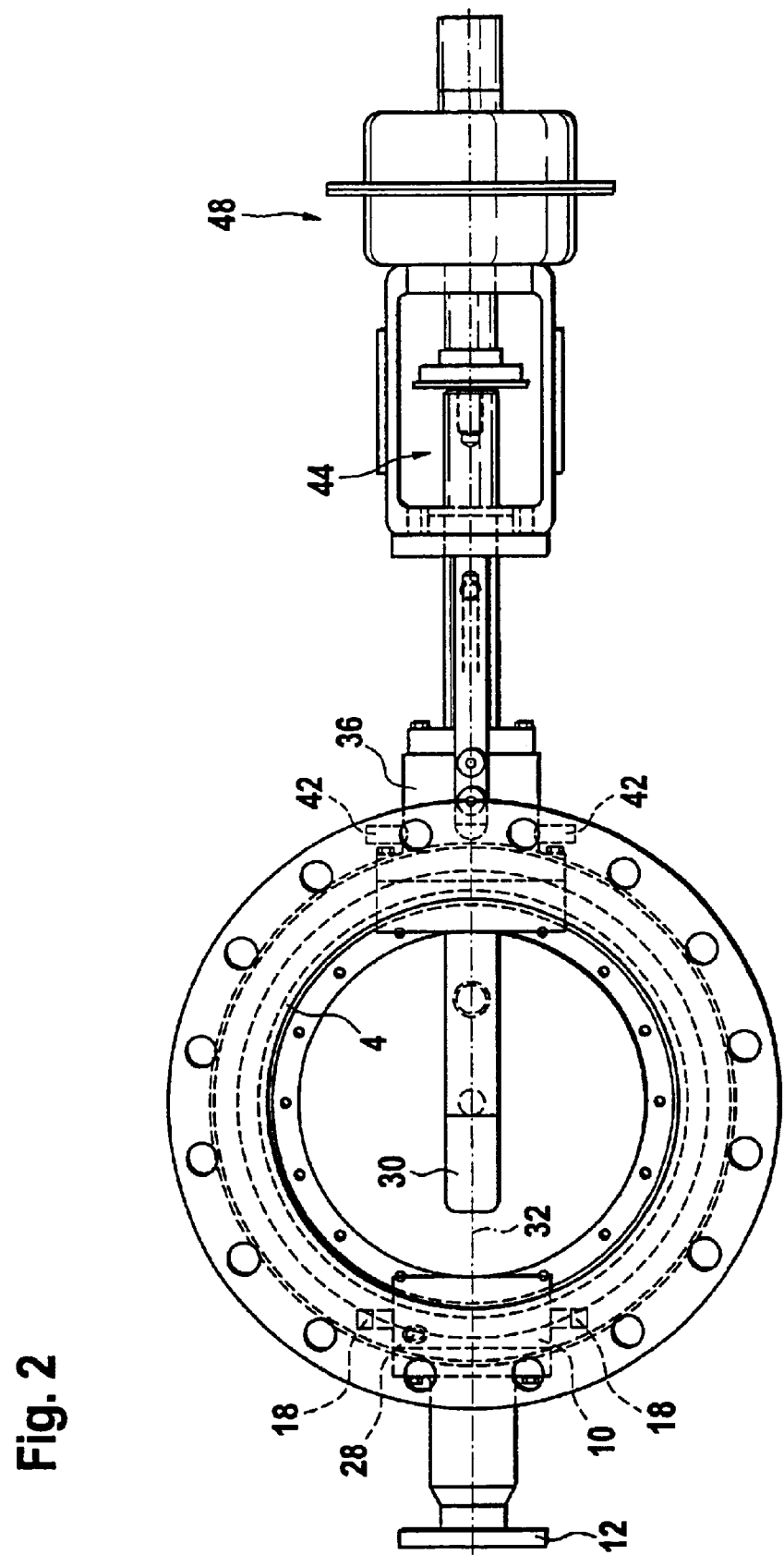
Figure 3:
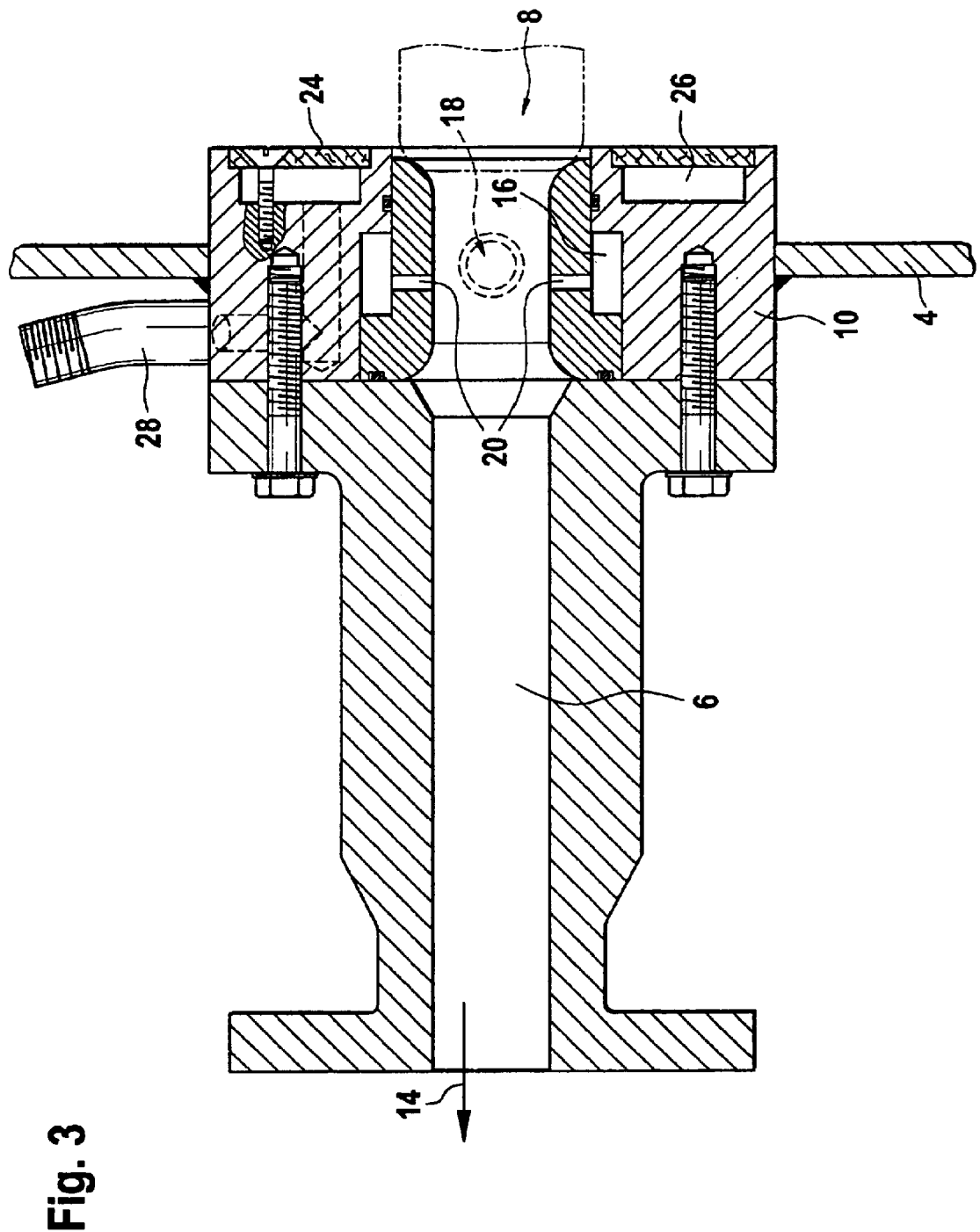

This application is entitled to the benefit of and incorporates by reference in their entireties essential subject matter disclosed in International Application No. PCT/EP01/10518 filed on Sep. 12 2001 and Luxembourg Patent Application No. 90639 filed on Sep. 18, 2000.

INTRODUCTION

The present invention relates to a device for introducing poorly flowing bulk material into a feed line.

Such a device is used, for example, in a device for injecting plastics into a shaft furnace, in which, instead of ground coal, comminuted plastic waste is injected into the shaft furnace. For this purpose, the comminuted plastic waste stored in a bunker is introduced into a feed line and is delivered by the latter under high pressure to the injection nozzles arranged in the wall of the shaft furnace.

As devices for introducing bulk materials under pressure into a transmission line, cellular-wheel sluices are, for example, known to be arranged under a storage bunker for the bulk material. A cellular wheel, consisting of a hub and a number of radial vanes, rotatably arranged in a cellular-wheel housing, divides the latter into a number of chambers. The bulk material enters one of the chambers through a charging aperture in the upper side of the cellular-wheel housing and, after the cellular wheel has, for example, rotated through 180° is introduced into the feed line through an outlet aperture in the underside of the housing. Such a cellular-wheel sluice is presented in WO-A-96/22241, for example.

Problems arise with such mechanical infeed devices, particularly when transmitting poorly-flowing, slightly fibrous material, such as, for example, comminuted plastic waste. The material moved on by the vanes of the cellular wheel is very easily compacted under its own weight as the cellular wheel rotates, so that its flow properties further deteriorate and introduction into the feed line becomes appreciably more difficult or even impossible. This leads to frequent blockages of the infeed device, whereby continuous operation of the plant is repeatedly disturbed. What is more, the compacted material penetrates into the cavities between the vanes of the cellular wheel and the cellular-wheel housing, and can bring the infeed device to a halt.

For this reason, in LU-A-90217, a device is proposed, having a swirl chamber, in which the poorly flowing material is converted to a disaggregated (loosened-up) state. A feed line is connected to the swirl chamber in such a way that the feed line forms an inlet aperture in a side wall of the swirl chamber. In front of the inlet aperture in the swirl chamber, a gas injection nozzle for a compressed gas is arranged. During operation, this gas injection nozzle generates a gas flow in the direction of the inlet aperture in the feed line. The formation of a swirl zone immediately in front of the inlet aperture into the feed line effectively prevents compacting of the poorly flowing bulk material before its entry into the feed line. The lateral arrangement of the inlet aperture thus prevents non-disaggregated material from getting into the feed line under its own weight. The blockages referred to above, and the plant shutdowns caused thereby, can therefore be prevented to a very large extent. Unfortunately, in practice, material repeatedly builds up around the inlet aperture, eventually resulting in the formation of a bridge between the gas injection nozzle and the region of the swirl-chamber wall around the inlet aperture.

OBJECT AND SUMMARY OF THE INVENTION

The task of the present invention is consequently to propose a device for the introduction of poorly flowing material into a feed line which avoids the problems described above to a very large extent.

This task is solved by a device for the introduction of poorly flowing bulk material into a feed line, with a swirl chamber to which the feed line can be externally connected in such a way that the feed line forms an inlet aperture in a side wall of the swirl chamber, and with a device for generating a gas flow inside the swirl chamber, wherein the gas flow is directed in the direction of the inlet aperture. According to the invention, a diffuser plate is further arranged in the side wall of the swirl chamber in the immediate vicinity of the inlet aperture, through which loosening fluid can be introduced into the swirl chamber.

A swirl zone, in which the poorly flowing bulk material is converted to a disaggregated state, is formed by the gas flow in front of the lateral inlet aperture in the feed line, thereby effectively preventing compacting of the poorly flowing bulk material in front of the inlet in the feed line. By virtue of the orientation of the gas flow in the direction of the inlet aperture, a velocity component in the direction of the inlet aperture is imparted to the disaggregated bulk material, which thereby enters therein.

The introduction of a disaggregating (loosening-up) fluid, e.g. a loosening gas, through the diffuser plate arranged in the immediate vicinity of the inlet aperture prevents bulk material from being deposited in this region on the side wall of the swirl chamber. Bridge formation between the wall and the gas injection nozzle can thereby be effectively prevented, so that the inlet aperture remains freely accessible while the plant is in operation.

Since the swirl zone in the swirl chamber is generally formed by the introduction of a loosening gas from below, the diffuser plate is preferably arranged under the inlet aperture. In order to prevent bridge formation over the entire periphery of the inlet aperture, the diffuser plate can, for example, consist of several sections arranged around the inlet aperture at the periphery of the inlet aperture. In an alternative embodiment, the diffuser plate is of an annular design, radially surrounding the inlet aperture over its entire periphery.

Introduction of the loosening fluid through the diffuser plate preferably takes place via a diffuser chamber, arranged in the side wall of the swirl chamber, in the immediate vicinity of the inlet aperture, wherein the diffuser plate seals off the diffuser chamber from the inside of the swirl chamber, and wherein the diffuser chamber can be exposed to a loosening gas. A uniform fluid throughput can thereby be achieved over the entire area of the diffuser plate.

The device for generating the gas flow comprises, for example, a gas injection nozzle connected to a compressed-gas supply, wherein the gas injection nozzle is arranged in the swirl chamber in such a way that the imaginary extension of its axis coincides with the axis of the feed line. The gas injection nozzle is, for example, arranged diagonally or radially opposite the inlet aperture, so that the gas flow runs essentially transversely through the swirl chamber.

The gas injection nozzle is preferably capable of travelling along its axis and is designed in such a way that the inlet aperture in the side wall can be closed by the gas injection nozzle. To this end, the end face of the gas injection nozzle facing towards the inlet aperture for example matches the inlet aperture of the feed line in shape and diameter, so that, when it travels as far as the side wall of the swirl chamber, the nozzle rests against the peripheral edge of the inlet aperture and closes it. The feed line can therefore be closed material-tight when the plant is at a standstill or before it is started up, without areas occurring in the feed line in which no delivery flow takes place and the material is accordingly compacted. Such areas, which occur in the line, for example, in the case of a simple slide-valve, between the slide valve and the next delivery-gas feed, regularly cause blockage of the line in the area concerned. If the inlet aperture is closed by the gas injection nozzle, such areas without a delivery flow cannot occur.

In addition, the distance between the gas injection nozzle and the inlet aperture in the side wall can be varied by moving the gas injection nozzle along its axis. The extent of the swirl zone formed in front of the inlet aperture can be varied accordingly, as also can the quantity of material converted to a disaggregated state. The greater the distance is between the inlet aperture and the gas injection nozzle, the larger will be the swirl zone formed and so will, accordingly, be the quantity of disaggregated material.

The gas injection nozzle is advantageously designed as a Laval nozzle, so that the gas flow exhibits the speed of sound. Such a Laval nozzle permits very simple control of the gas throughput of the nozzle through simple control of the admission pressure of the gas, regardless of the pressure prevailing in the swirl chamber. In addition, with such a Laval nozzle, a very well-directed gas flow in the direction of the inlet aperture is obtained, which, by virtue of the high gas-velocity, can also effectively introduce the material into the feed line over a greater distance between nozzle and inlet aperture.

In a preferred embodiment, the device exhibits a number of metering-gas nozzles, which are arranged in the side wall around the feed line, in such a way that they discharge into the feed line. The metering-gas nozzles are preferably arranged in such a way that they discharge into the feed line at right angles to its axis. Alternatively, the metering-gas nozzles can be arranged in such a way that they discharge in the direction of the delivery flow, at an angle to the axis of the feed line.

Through these metering-gas nozzles, a metering gas required for the further transmission of the material in the feed line is introduced immediately down-stream from the inlet aperture into the feed line. Consequently, immediately after it has been conducted into the inlet aperture by the gas flow present in the swirl chamber, the bulk material is consequently entrained by the metering-gas flow and conveyed further by it. Areas in which the material can settle out from the delivery flow and become compacted are consequently not produced. It should be noted that, where there is a change in the metering-gas quantity, the quantity of material delivered also changes. Controlling the metering-gas quantity can consequently be used to control the quantity of material.

The swirl chamber is advantageously designed as a pressure vessel, so that it is possible to introduce bulk material into a pressurised feed line. In this case, the entire swirl chamber is operated under an "overpressure". In addition, in its lower region, the swirl chamber preferably has a diffuser plate, through which a loosening gas can be introduced into the swirl chamber. The poorly flowing bulk material can thereby be kept in a fluidised state throughout the swirl chamber, thereby preventing compacting of the material.

BRIEF DESCRIPTION OF THE DRAWINGS

An embodiment of the invention is described in the following, by reference to the attached figures, which show:

FIG. 1: a longitudinal section through a preferred embodiment of a device for introducing poorly flowing bulk material into a feed line;

FIG. 2: a plan view of the device in FIG. 1;

FIG. 3: an enlargement of the area around the inlet aperture in FIG. 1;

FIG. 4: an embodiment of an injection vessel with a number of devices for introducing poorly flowing bulk material into a feed line;

FIG. 5: a section through the lower region of the injection vessel in FIG. 4.

DETAILED DESCRIPTION OF THE INVENTION

FIG. 1 shows a longitudinal section through a preferred embodiment of a device 2 for introducing poorly flowing bulk material into a feed line. This essentially comprises a swirl chamber 4 which is cylindrical for example, to which a feed line 6 can be externally connected, in such a way that it forms an inlet aperture 8 in the wall of the swirl chamber 4 for the bulk material being conveyed.

In the embodiment represented, the wall of the swirl chamber 4 has a socket 10 welded on the side, to which the feed line 6 can be connected by means of a flange 12 (see also FIG. 3). In the socket 10, downstream in the delivery direction (represented by arrow 14), and directly behind the aperture 8, an annular channel 16 is executed around the feed line 6, which can be subjected to a metering gas via one or more connections 18 (see FIG. 2).

In addition, a number of metering-gas nozzles 20 are executed around the feed line 6 in the socket 10, extending from the annular channel 16, at right angles to the axis of the feed line 6, as far as the feed line 6, forming discharge openings into the latter. If the annular channel 16 is subjected to a metering gas at high pressure, the gas flows through the discharge openings into the feed line 6, where it forms a delivery flow for the material being conveyed. The bulk material which passes through the inlet aperture 8 into the feed line 6 is entrained by the delivery flow directly after the inlet aperture and conveyed further on.

Around the inlet aperture 8, an annular channel 22, open in the direction of the swirl chamber, is executed in the socket 10. Towards the inside of the swirl chamber, this annular channel is covered by an annular gas-permeable diffuser plate 24, so that an annular diffuser chamber 26 is formed. The diffuser chamber is exposed to a loosening gas via a gas connection 28, the said gas flowing into the swirl chamber through the diffuser plate 24. Deposits are thereby prevented in the region of the periphery of the inlet aperture 8, and the associated bridge formation is consequently effectively prevented.

In order to introduce bulk material into the inlet aperture, the device 2 has a gas injection nozzle 30 which, during operation, produces a directed gas flow at high velocity in the direction of the inlet aperture 8. The gas injection nozzle 30 can, for example, be a Laval nozzle, arranged in the swirl chamber 4 radially opposite the inlet aperture 8, in such a way that the imaginary extension of its axis 32 coincides with the axis of the feed line 6.

The gas injection nozzle 30 is connected via a gas feed-pipe 34 and, for example, a rotary connector, to a compressed-gas supply, by means of which the nozzle 30 can be subjected to a compressed gas. For this purpose the gas feed-pipe 34 is preferably led out from swirl chamber 4 through a hole in socket 36 set in the wall of the swirl chamber 4, wherein a stuffing box or gland 38 is used for sealing, for example. Between the stuffing box 38 and the swirl chamber 4, an annular groove 40 is preferably executed in the socket 36 around the hole, which can be exposed to a barrier gas from outside, via connections 42. During operation, this barrier gas then prevents penetration of bulk material into the hole and stuffing box.

If the gas injection nozzle 30 is exposed to a compressed gas, it produces a gas flow inside the swirl chamber 4, forming a swirl zone in front of the inlet aperture 8. In this swirl zone, the poorly flowing bulk material is converted to a loosened state, thereby acquiring a velocity component in the direction of the inlet aperture 8 by virtue of the alignment of the gas flow in the direction of the inlet aperture 8, so that the swirled-up material enters the aperture.

The use of a Laval nozzle to produce the directed gas-flow permits, on the one hand, very simple control of the gas throughput of the nozzle 30, by simple control of the admission pressure of the gas, regardless of the pressure prevailing in the swirl chamber 4. On the other hand, with such a Laval nozzle, a very well-directed gas flow is obtained in the direction of the inlet aperture 8; this gas flow can, by virtue of the high gas-velocity, also effectively introduce the material into the feed line 8, over a greater distance between nozzle and inlet aperture.

The gas injection nozzle 30 is preferably arranged movable along its axis 22, so that the distance between the gas injection nozzle 30 and the inlet aperture 8 in the side wall is variable. In the shown embodiment of the device, the gas injection nozzle 30, and the axially attached gas feed pipe 34, is displaceably supported in the hole of the socket 36. The gas injection nozzle is then, for example, driven via an axial drive 48, coupled to the rear end 44 of the gas feed-pipe. Alternatively, the gas feed-pipe can have a worm thread at its rear end, interacting with a corresponding thread in a threaded plate mounted on the socket. If the gas feed-pipe 34 is rotated about its own axis by a drive, the gas feed-pipe 34, together with the nozzle 30 mounted thereon, will be screwed further into or out of the swirl chamber, depending on the direction of rotation. In this way, the distance between the inlet aperture 8 and the gas injection nozzle can be adjusted between 0 and 30 mm, for example.

It should be noted that the threaded plate 46 is preferably arranged a certain distance from the swirl chamber 4, so that the worm thread can be designed in such a way that it does not reach into the stuffing box 38, even when the nozzle 30 is fully in.

The gas injection nozzle 30 is preferably designed in such a way that the inlet aperture 8 in the side wall can be closed by the gas injection nozzle 30. For this purpose, the front face 50 of the gas injection nozzle 30 facing the inlet aperture, for example, matches the inlet aperture 8 in the feed line 6 in shape and diameter, so that, when it has travelled as far as the side wall of the swirl chamber 4, the nozzle rests against the peripheral edge of the inlet aperture 8 and closes it. This position of the gas injection nozzle is represented by a dashed line in FIG. 1.

When the plant is shut down, or before it is started up, the feed line 6 can therefore be closed material-tight, without areas occurring in the feed line 6 in which no delivery flow is present and the material is consequently compacted.

Such areas, which, for example, in the case of a simple slide-valve, occur in the line between the slide valve and the next metering-gas feed, regularly cause the line to be blocked in this region. If the inlet aperture is closed by the gas injection nozzle, such areas without a delivery flow cannot arise.

The swirl chamber 4 is advantageously designed as a pressure vessel, so that it is possible to introduce bulk material into a feed line under pressure. In this case, the entire swirl chamber can be operated at an "overpressure" (i.e. above atmospheric), for which, depending on the application, overpressures of up to 10 bar are customary. In addition, in its lower region, the swirl chamber 4 preferably has a diffuser plate 52, through which a loosening gas can be introduced into the swirl chamber. The diffuser plate 52 is, for example, mounted on the lower lid-flange 54 of the swirl chamber 4, said flange being for its part detachably screwed to the side wall of the swirl chamber. A gas feed-pipe 56 extends through the lid flange 54 and discharges into a diffuser chamber 58 between the lid flange 54 and the diffuser plate 52.

If the diffuser plate 52 is subjected to an inflowing gas via the gas feed-pipe 56, the poorly flowing bulk material is kept in a fluidised state throughout the swirl chamber, thereby preventing compacting of the material.

It should be noted that both the Laval nozzle and also the wall around the inlet aperture 8 preferably consist of a hardened material, e.g. a hard metal or a ceramic material, in order as far as possible to minimize wear caused by accelerated bulk-material particles.

It should also be noted that, in operation, the swirl chamber can, for example, be mounted directly under a storage bunker for the bulk material. Transfer of the bulk material into the swirl chamber then takes place directly under the action of gravity. The diameter of the swirl chamber 4 should therefore be selected such that the bulk material is not prevented from dropping.

Figure 4:
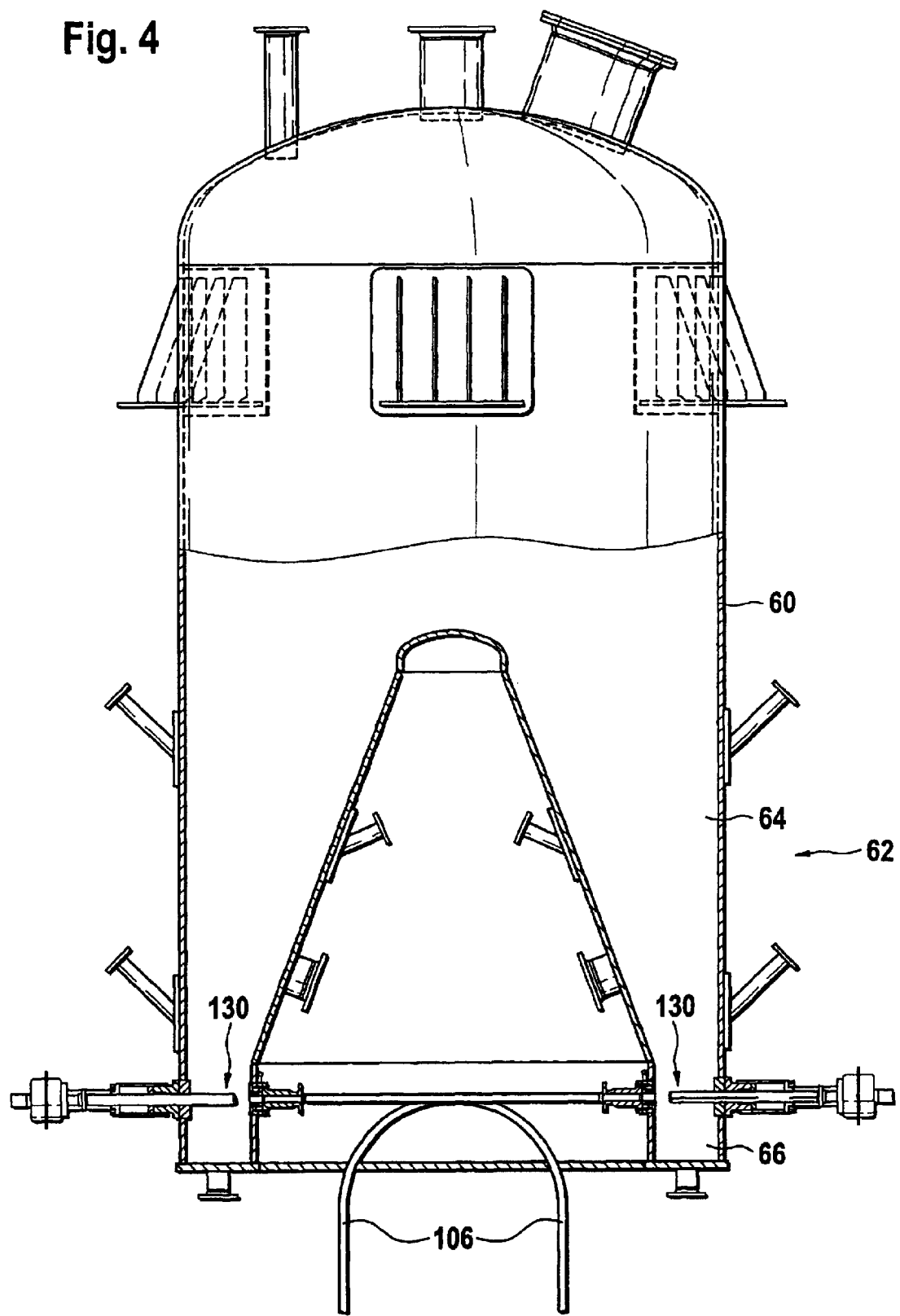
Figure 5:
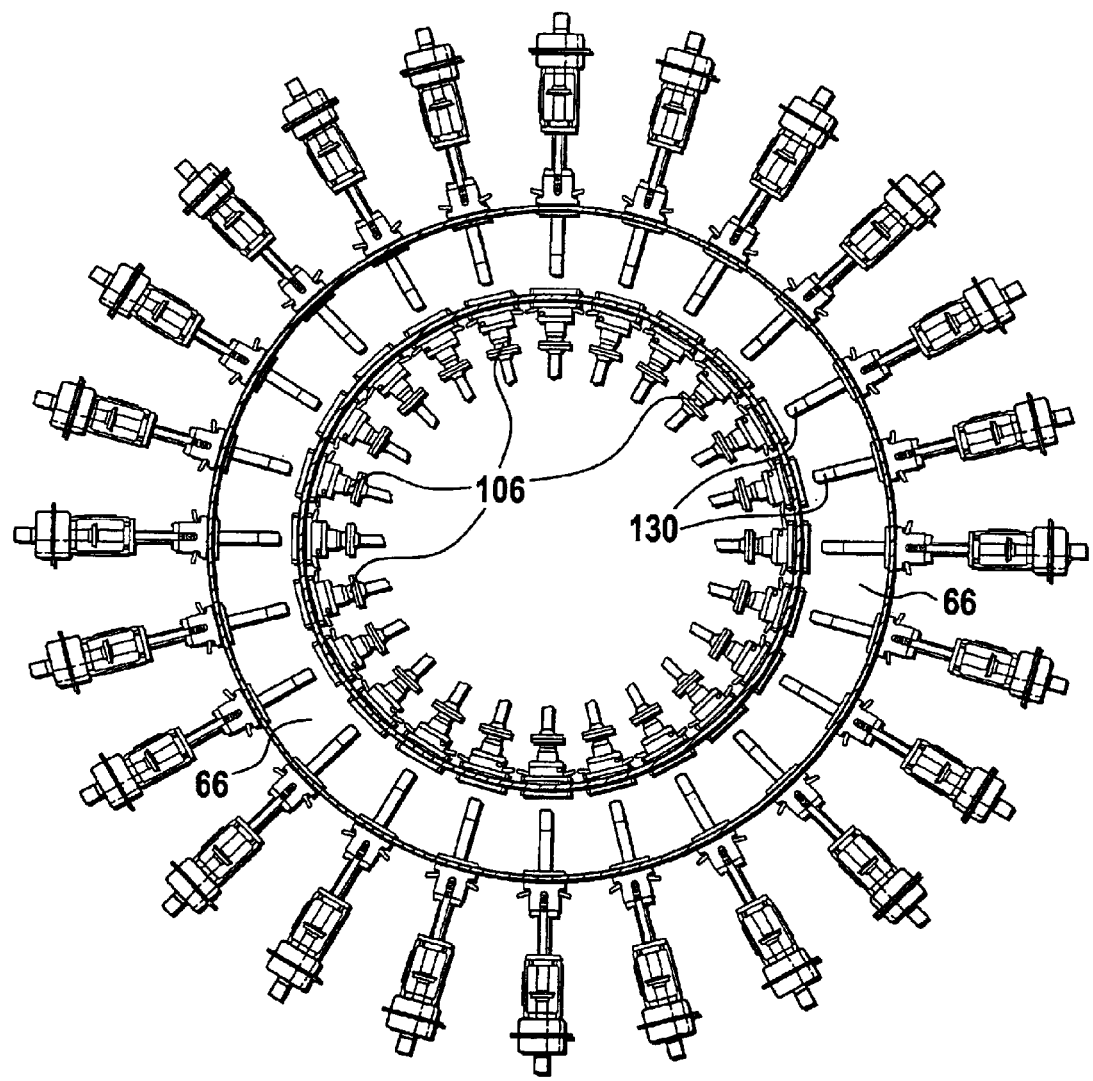

In another embodiment, the swirl chamber is an integral part of an injection vessel. Such an embodiment is represented in FIGS. 4 and 5. It is an injection vessel for the simultaneous introduction of bulk material into 24 different feed lines. The injection vessel has an essentially cylindrical pressure vessel 60, closed on its upper side, which has various sockets for the connection of compressed-gas lines or disaggregating-gas lines. The bottom of the pressure vessel 60 is graded conically inwards in such a way that, in its lower region 62, the pressure receiver 60 comprises an annular cross-section becoming narrower downwards. In other words, an annular hopper 64 is formed in the lower region of the cylindrical pressure vessel, on which hopper the bulk material in the receiver slides along as far as a lower annular swirl chamber 66. 24 feed lines 106, of the type described above, are connected radially from within to the annular swirl chamber 66, wherein a corresponding number of gas injection nozzles 130 are arranged opposite the feed lines 106 and mounted in the swirl chamber radially from outside.

LIST OF REFERENCE NUMBERS

2 Device for introducing bulk material into a feed line
4 Swirl chamber
6 Feed line
8 Inlet aperture
10 Socket
12 Flange
14 Delivery direction, represented by the arrow
16 Annular channel
18 Connections for metering-gas 20 Metering-gas nozzles
22 Annular channel
24 Diffuser plate
26 Diffuser chamber
28 Gas connection for disaggregating (loosening-up) gas
30 Gas injection nozzle
32 Axis
34 Gas feed-pipe
36 Socket
38 Stuffing box or gland
40 Annular groove
42 Connections for barrier gas
44 Rear end of gas feed-pipe
48 Drive
50 End face of gas injection nozzle
52 Diffuser plate
54 Lid flange
56 Gas feed-pipe
58 Diffuser chamber
60 Pressure receiver
62 Lower region of pressure receiver
64 Annular hopper
66 Annular swirl chamber
106 Feed lines
130 Gas injection nozzles

What is claimed is:

1. A device for introducing poorly flowing bulk material into a feed line, comprising
    a swirl chamber, said swirl chamber being connectable to a feed line in such a way that said feed line forms an inlet aperture in a side wall of said swirl chamber,
    a diffuser plate through which a loosening fluid can be introduced into the swirl chamber, said diffuser plate being arranged at the periphery of said inlet aperture around said inlet aperture in said side wall of said swirl chamber, and
    a device for producing a gas flow inside the swirl chamber, said gas flow being directed in the direction of the inlet aperture.

2. The device according to claim 1, wherein said diffuser plate comprises several sections arranged around said inlet aperture.

3. The device according to claim 1, wherein said diffuser plate comprises an annular design and wherein said diffuser plate is arranged so as to radially surrounds said inlet aperture.

4. The device according to claim 1, further comprising a diffuser chamber arranged in the side wall of said swirl chamber in the vicinity of said inlet aperture, wherein said diffuser plate closes said diffuser chamber towards the inside of the swirl chamber, and wherein the diffuser chamber is subjected to a loosening gas.

5. The device according to claim 1, wherein said device for producing the gas flow comprises a gas injection nozzle connected to a compressed-gas supply, said gas injection nozzle being arranged in the swirl chamber in such a way that an imaginary extension of an axis of said injection nozzle coincides with an axis of the feed line.

6. The device according to claim 5, wherein said gas injection nozzle is movable along its axis in such a way, that said inlet aperture in the side wall can be closed by the gas injection nozzle.

7. The device according to claim 5, wherein said gas injection nozzle is designed as a Laval nozzle, so that the gas flow exhibits the speed of sound.

8. The device according to claim 1, further comprising a number of metering-gas nozzles arranged in said side wall around said inlet aperture in such a way that said metering-gas nozzles discharge into the feed line.

9. The device according to claim 1, wherein the swirl chamber is designed as a pressure vessel.

10. The device according to claim 1, wherein said swirl chamber comprises a diffuser plate arranged in a lower region of said swirl chamber, diffuser plate through which a loosening gas can be introduced into the swirl chamber.

* * * * *